J. FAWELL.
MANIPULATOR FOR ROLLING MILLS.
APPLICATION FILED JULY 1, 1908.

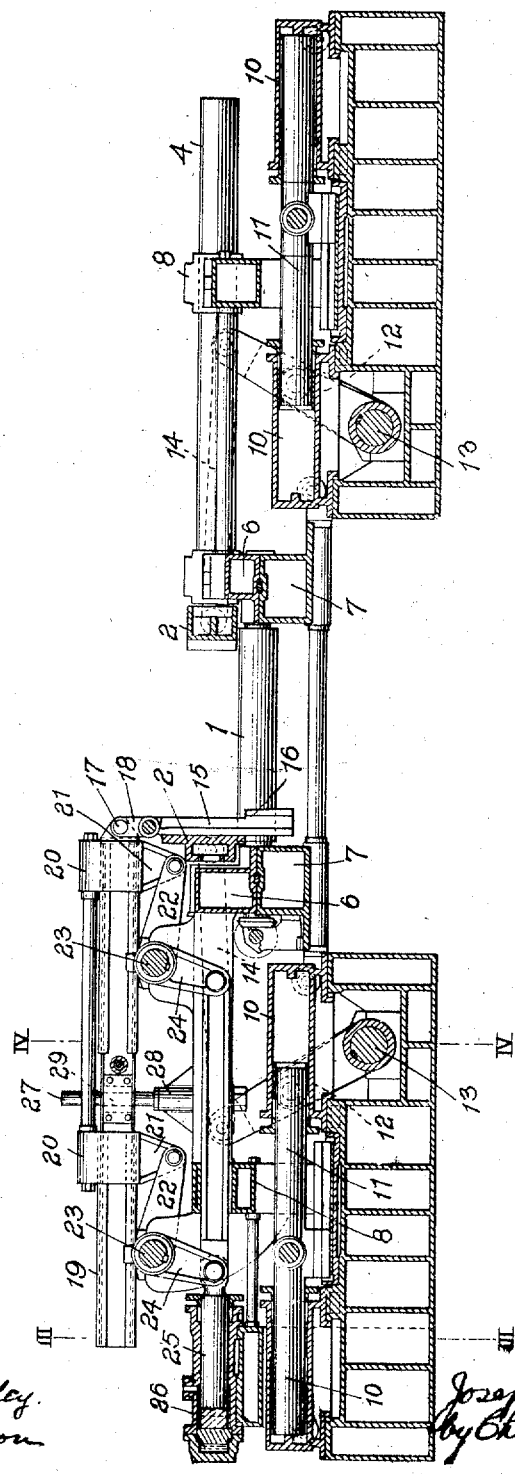

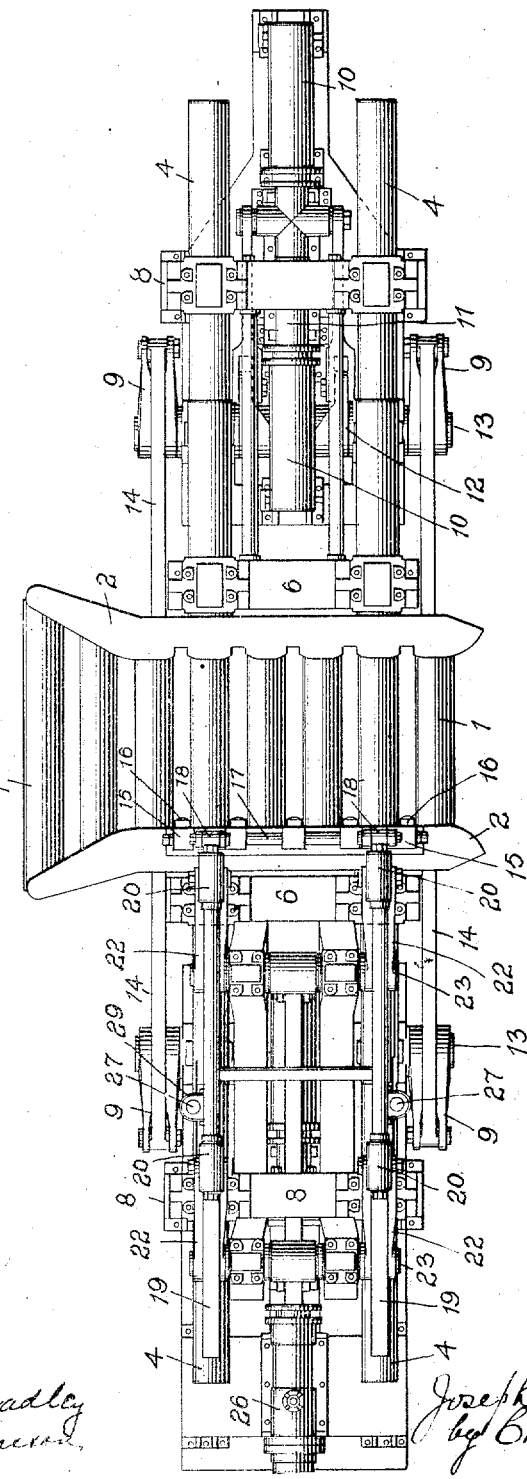

971,740.

Patented Oct. 4, 1910.
7 SHEETS—SHEET 3.

WITNESSES:
J. Herbert Bradley.
Francis J. Tomasson.

INVENTOR
Joseph Fawell
by Christy and Christy
Attys

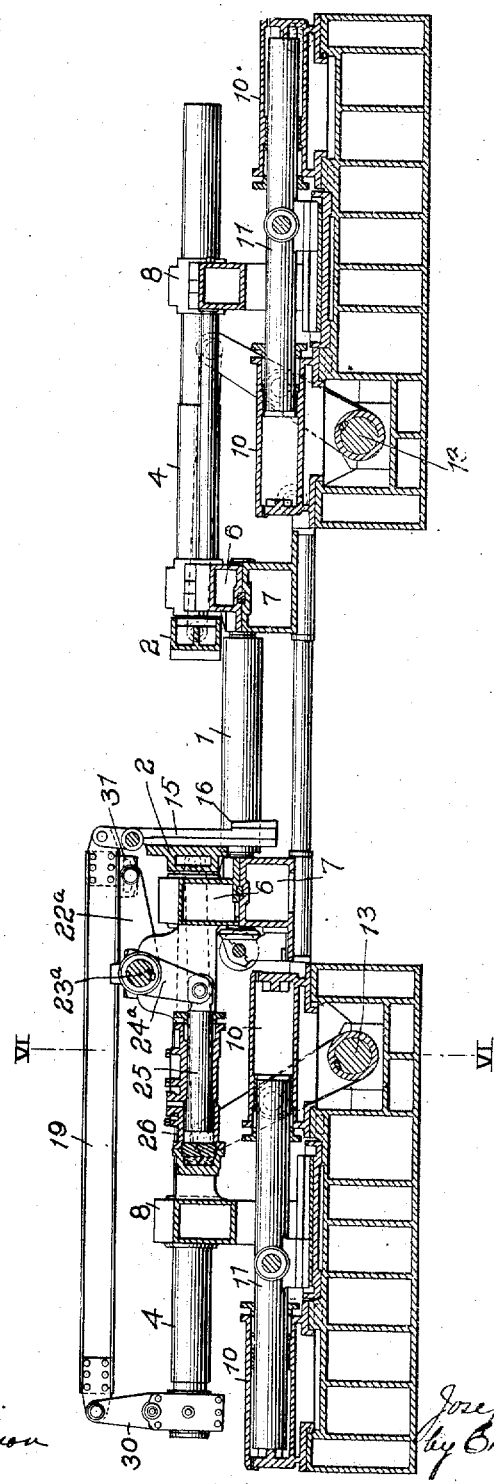

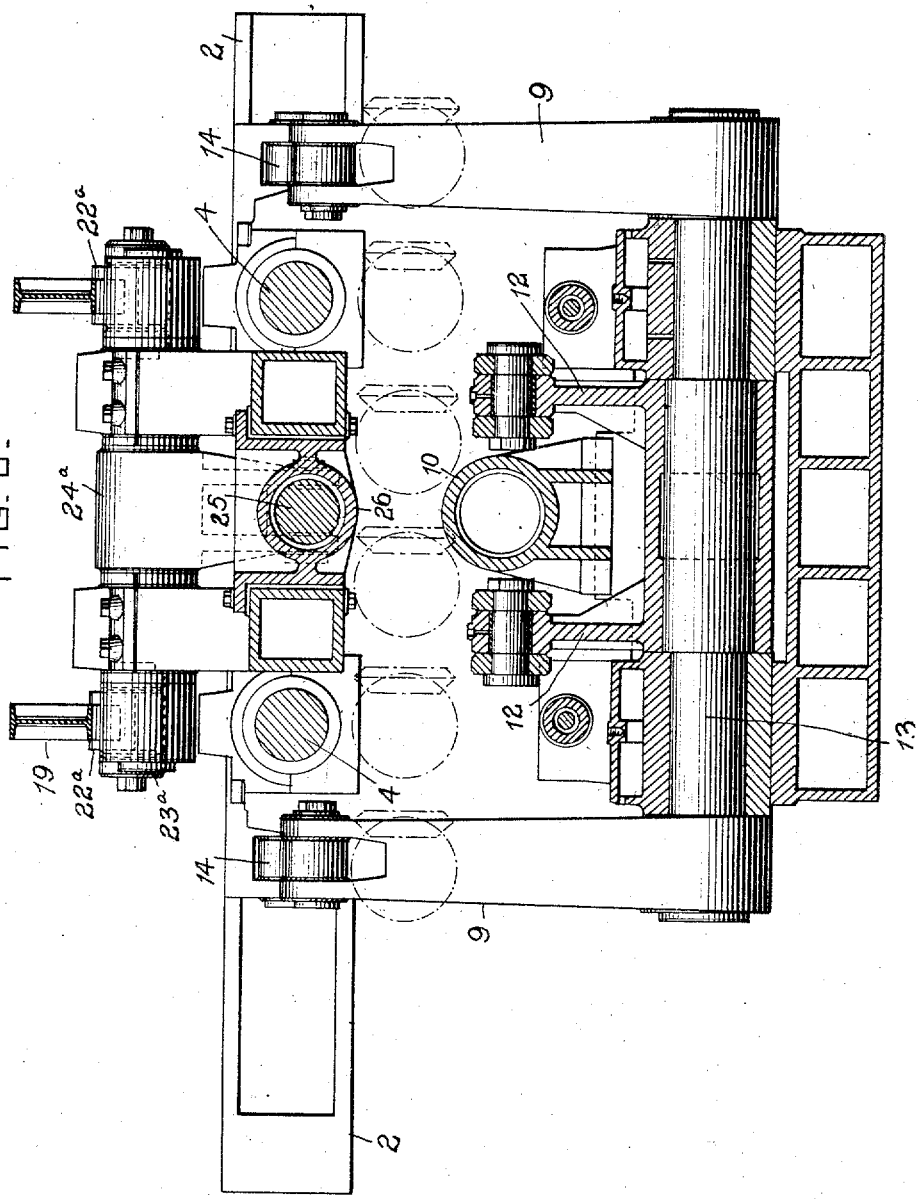

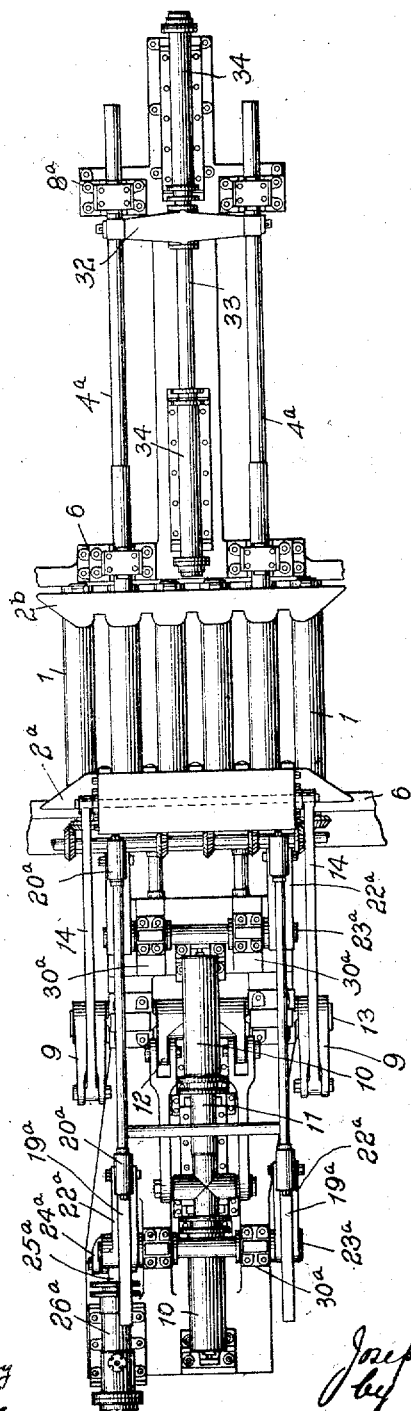

J. FAWELL.
MANIPULATOR FOR ROLLING MILLS.
APPLICATION FILED JULY 1, 1908.
971,740.
Patented Oct. 4, 1910.
7 SHEETS—SHEET 7.
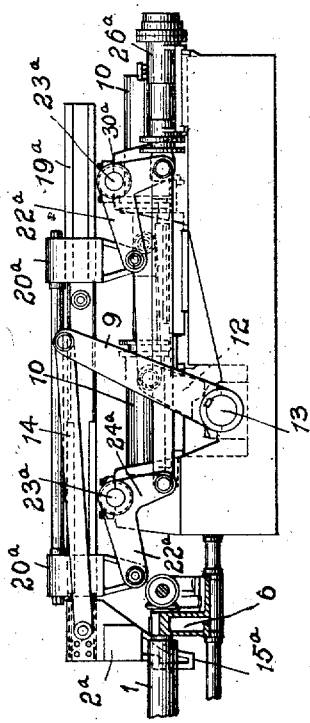
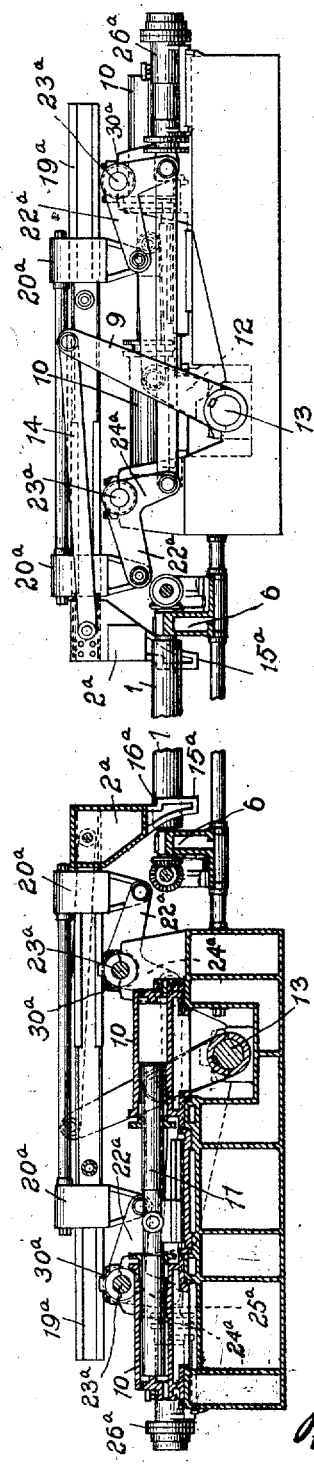
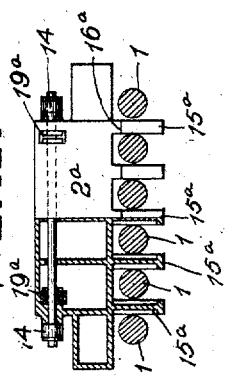
WITNESSES:
INVENTOR
Joseph Fawell
by Christy and Christy
Atty's

UNITED STATES PATENT OFFICE.

JOSEPH FAWELL, OF PITTSBURG, PENNSYLVANIA.

MANIPULATOR FOR ROLLING-MILLS.

971,740.  Specification of Letters Patent.  Patented Oct. 4, 1910.

Application filed July 1, 1908. Serial No. 441,376.

*To all whom it may concern:*

Be it known that I, JOSEPH FAWELL, residing at Pittsburg, in the county of Allegheny and State of Pennsylvania, a citizen of the United States, have invented or discovered certain new and useful Improvements in Manipulators for Rolling-Mills, of which improvements the following is a specification.

In a patent No. 915,669, granted March 16, 1909, is shown and described a construction of manipulator mechanism for feed tables of rolling mills characterized by a combination wherein the mechanism for operating the turning bars are movable back and forth with the head or abutment, whereby the ingots are to be shifted laterally on the feed table.

The invention described herein has for its object a construction in which the prime mover or motor has a mechanically sliding connection with the turning bars, thus permitting such motor to be fixedly arranged and avoiding the use of extensible connections between the motor and the sources of power supply.

The invention is hereinafter more fully described and claimed.

Figure 4:
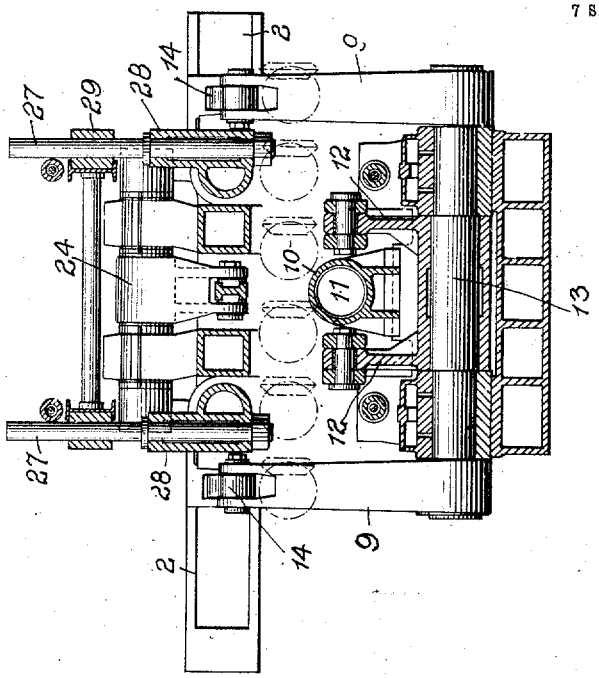
Figure 3:
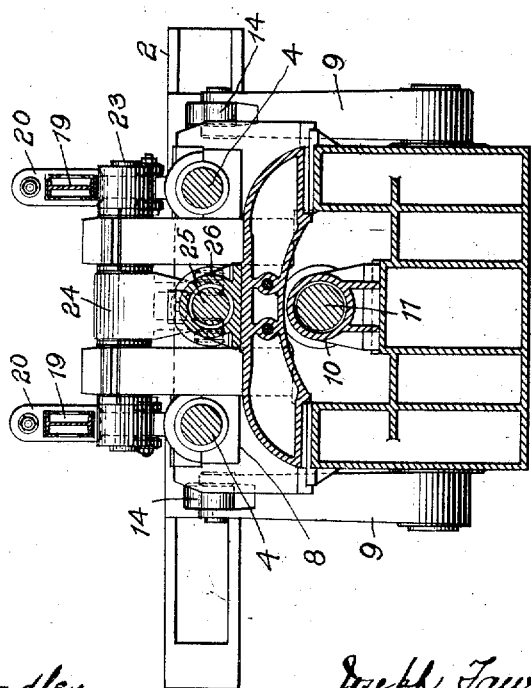

In the accompanying drawings forming a part of this specification, Figure 1 is a sectional elevation of ingot manipulating mechanism, such manipulation including the lateral movement of the ingot across the table and its axial turning; Fig. 2 is a top plan view of the same; Figs. 3 and 4 are sectional elevations or planes indicated respectively by the lines III—III and IV—IV, Fig. 1; Fig. 5 is a view similar to Fig. 1 illustrating a modification of the improvement and Fig. 6 is a sectional elevation on an enlarged scale, the plane of section being indicated by the line VI—VI Fig. 5. Fig. 7 is a plan view of a feed table and ingot shifting and turning mechanism embodying a further modification of my improvement; Figs. 8 and 9 are elevations showing opposite sides of the combined ingot turning and shifting mechanism and Fig. 10 is a view partly in section and partly in elevation of the combined ingot shifter and turning bar.

In the practice of my invention the feed table is constructed as regards the feed rollers 1 and their operating mechanism, in the usual or any suitable manner. Heads or abutments 2 are supported above the plane of the feed rollers and at right angles to the latter by guides 4, preferably tubular and having bearings in blocks 6 arranged above and in line with the side frames of the feed table. It is preferred that these blocks 6 should be formed integral with the caps for the bearings of the journals of the feed rollers 1 or as many thereof as are spanned by the head or abutment as described in the application referred to. These guide members 4 extend back and have additional bearings in a frame 8 arranged parallel with the side frames 7 of the table and preferably tied thereto by suitable rods. The bearing blocks 6 and frames 8 should be spaced a distance apart sufficient to form a firm and steady support to the guide rods of the abutments or heads. By thus supporting the heads or abutments by bearings above the planes of the rollers there will not be any liability of the guides or their bearings being cut by scale, etc. These heads or abutments are shifted transversely of the feed table by any suitable mechanism, preferably by means of fluid pressure cylinders 10 having a common ram or piston 11 connected to an arm 12 which is secured to a shaft 13. Arms 9 are also connected to this shaft and have their upper ends connected by links 14 to the heads or abutments.

The axial turning of the ingot is effected by turning bars 15 which are preferably constructed with shoulders 16 adapted to engage under one edge of the ingot lying on the feed rollers. These turning bars should be so supported as to be capable of movement transversely of the table and preferably to move with the heads or abutments in their movement transversely of the table. To this end it is preferred to arrange the turning bars in grooves formed in the vertical faces of the heads or abutments as shown in Fig. 1. The upper ends of these turning bars are connected to a lifting member or members 19 preferably by means of links 18 connected at one end to the upper ends of the turning bars and having their opposite ends loosely connected to shaft 17 carried by the lifting member. The lifting member or members 19 are movably supported in sleeves 20 suitably spaced to form a steady support for the lifting member, and provided with lugs 21 pivotally connected to the outer ends of arms 22 secured to shafts 23 mounted in suitable bearings carried by 11 the stationary frame of the manipulator. Arms 24 are also secured to these shafts and have their outer ends connected to the ram 25 of the fluid pressure cylinder 26. As will be readily understood the movement of this ram will cause a vertical movement of the lifting members and a corresponding movement of the turning bars. In order to guide the lifting members and hold them steady, posts 27 are arranged in sockets 28 formed integral with the guides 4, said posts extending up through sleeves 29 secured to the lifting members as clearly shown in Figs. 1, 2 and 4.

In lieu of moving the lifting members equally throughout their entire length as in the construction shown in Figs. 1 to 4, such lifting members may have their outer ends pivotally connected to standards 30 secured to the rear ends of the tubular guides 4. In this construction the inner ends of the lifting members rest upon shoes 31 carried by the arm $22^a$ secured to the shaft $23^a$, which has an arm $24^a$ also secured thereto and having its end connected to the ram 25 of the cylinder 26.

It is characteristic of the construction shown herein that the lifting members carrying the turning bars are slidably supported by the mechanism employed for raising and lowering these members and the turning bars. As hereinbefore stated it is preferred that the turning bars should move transversely of the feed table with the heads or abutments and a synchronous movement of the turning bars with their lifting members with the heads or abutments is assured in the construction shown in Figs. 1 to 4 by the guide posts 27 and in the construction shown in Figs. 5 and 6 by the connection of the outer ends of the lifting members with the guides 4.

As shown in Figs. 7 to 10, the lateral shifting and the axial turning of the ingot may be effected by the same part or member. A desirable construction for this purpose consists of a head or abutment $2^a$ provided with a series of bars or fingers $15^a$ suitably spaced to extend down between the feed rollers 1 and provided with ingot engaging shoulders $16^a$. The head or abutment $2^a$ is secured to shifting and lifting beams $19^a$, which are mounted in sleeves $20^a$ pivotally supported on the outer ends of arms $22^a$ secured on shafts $23^a$ mounted in stationary bearings $30^a$ on the frame of the manipulator. The shaft is oscillated to raise and lower the head or abutment $2^a$ by a fluid pressure cylinder $26^a$ which has its ram $25^a$ connected to arms $24^a$ secured to the shafts $23^a$. The horizontal movement of the head or abutment to shift the ingot transversely of the table is effected by fluid pressure cylinders 10 having their rams 11 connected to an arm 12 on the shaft 13, which is provided with arms 9 having their outer ends connected by links 14 to the head or abutment.

The head or abutment $2^b$ for shifting the ingot toward the head $2^a$ is secured to guiding members $4^a$ mounted in suitable bearings arranged above the side frame of the feed table and on an auxiliary frame $8^a$. These guiding members are connected to opposite ends of a cross-head 32 which is in turn connected to the rams 33 of fluid pressure cylinders 34.

As will be readily understood by those skilled in the art a shifting of the ingot can be effected by moving the head $2^a$ horizontally over the feed rollers. While a turning of the ingot can be effected by lowering the head until the shoulder $16^a$ is below the ingot and then raising the head. A shifting and turning of the ingot can be effected at the same time by moving the head horizontally and vertically.

I claim herein as my invention:

1. A manipulator for ingots having in combination ingot-carrying means, a head movable transversely of and above the ingot-carrying means, ingot-engaging portions movable with the head, supporting members movable above the ingot-carrying means and carrying the ingot-engaging portions, and means for moving the supporting members vertically and means for moving such members with respect to the vertically moving means.

2. A manipulator having in combination means for feeding an ingot, supporting members movably supported above the line of feed of the ingot at points laterally outside of the feeding means, ingot-engaging portions carried by said members and means for shifting the supporting members vertically and horizontally.

3. A manipulator having in combination means for feeding an ingot, supporting members supported above the feeding means and movable in a direction at an angle to said line of feed, a head carried by the supporting members, means for shifting the head transversely to said feed and ingot-turning means movable with and relative to the head.

4. A manipulator having in combination an ingot feeding means, supporting members movable above and in planes at or approximately at right angles to the line of feed of the article to be rolled, ingot turning means depending from the supporting members, means arranged at one side of the ingot-feeding means for supporting said members, and means for raising and lowering the member-supporting means.

5. A manipulator having in combination movable sleeves, supporting members slidably mounted in said sleeves, ingot-moving means depending from the supporting members; means for raising and lowering the sleeves and means for shifting the ingot-moving means.

6. A manipulator having in combination longitudinally movable supporting members, ingot-moving means depending from the supporting members, a stationary motor for moving the supporting means, and connections between the motor and the supporting members, said connections including means for slidably supporting said members.

7. A manipulator having in combination ingot feeding means, movable supporting members, means arranged above the line of feed to support said members, ingot moving means carried by the supporting members, and means for shifting the supporting members vertically and horizontally.

8. A manipulator having in combination ingot feeding means longitudinally movable supporting members arranged above the line of movement of the article being rolled, ingot-moving means depending from the supporting members, and stationary motors for shifting the supporting members vertically and horizontally.

In testimony whereof, I have hereunto set my hand.

JOSEPH FAWELL.

Witnesses:
CHARLES BARNETT,
FRANCIS J. TOMASSON.